United States Patent

[11] 3,600,087

[72] Inventors Jack L. Goodman
Chappaqua;
Lynne P. Brown, Tarrytown; Dorothy A. Podesta, Bronx, all of, N.Y.
[21] Appl. No. 735,059
[45] Patented Aug. 17, 1971
[73] Assignee Harcourt, Brace & World
New York, N.Y.

[54] METHOD OF MAKING A MULTICOLOR SLIDE TRANSPARENCY AND THE PRODUCED SLIDE TRANSPARENCY
17 Claims, 8 Drawing Figs.

[52] U.S. Cl..................................................... 355/32,
95/12.2, 355/77, 355/88
[51] Int. Cl....................................................... G03b 27/76,
95 12.2
[50] Field of Search.......................................... 355/32, 88,
77

[56] References Cited
UNITED STATES PATENTS
2,721,496  10/1955  Guthrie ........................  355/32

*Primary Examiner*—Samuel S. Matthews
*Assistant Examiner*—Richard A. Wintercorn
*Attorneys*—Kenyon & Kenyon, Reilly, Carr & Chapin

ABSTRACT: The slide transparencies are made for projection in daylight without the use of screens. The slide transparencies are prepared by sequentially exposing a film to different combinations of registered overlays. The overlays include transparent and opaque areas with preselected portions of the transparent areas covered by transparent colored gels. Each exposure of a film forms an image on the film corresponding to the color and pattern of light passing through the registered overlays. The film is then used to make the slide transparencies.

INVENTORS
JACK L. GOODMAN
LYNNE P. BROWN
DOROTHY A. PODESTA
BY Kenyon & Kenyon
ATTORNEYS

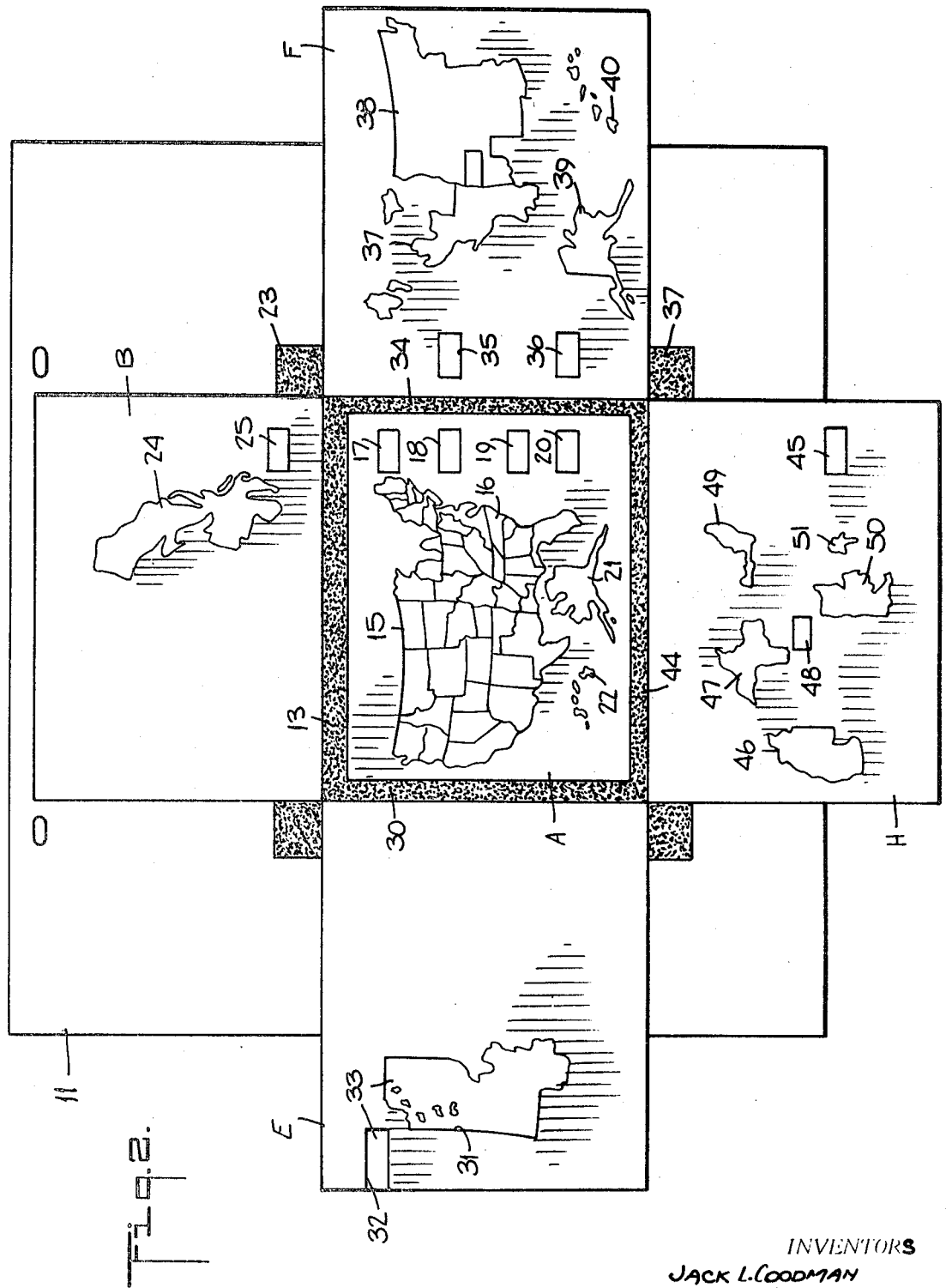

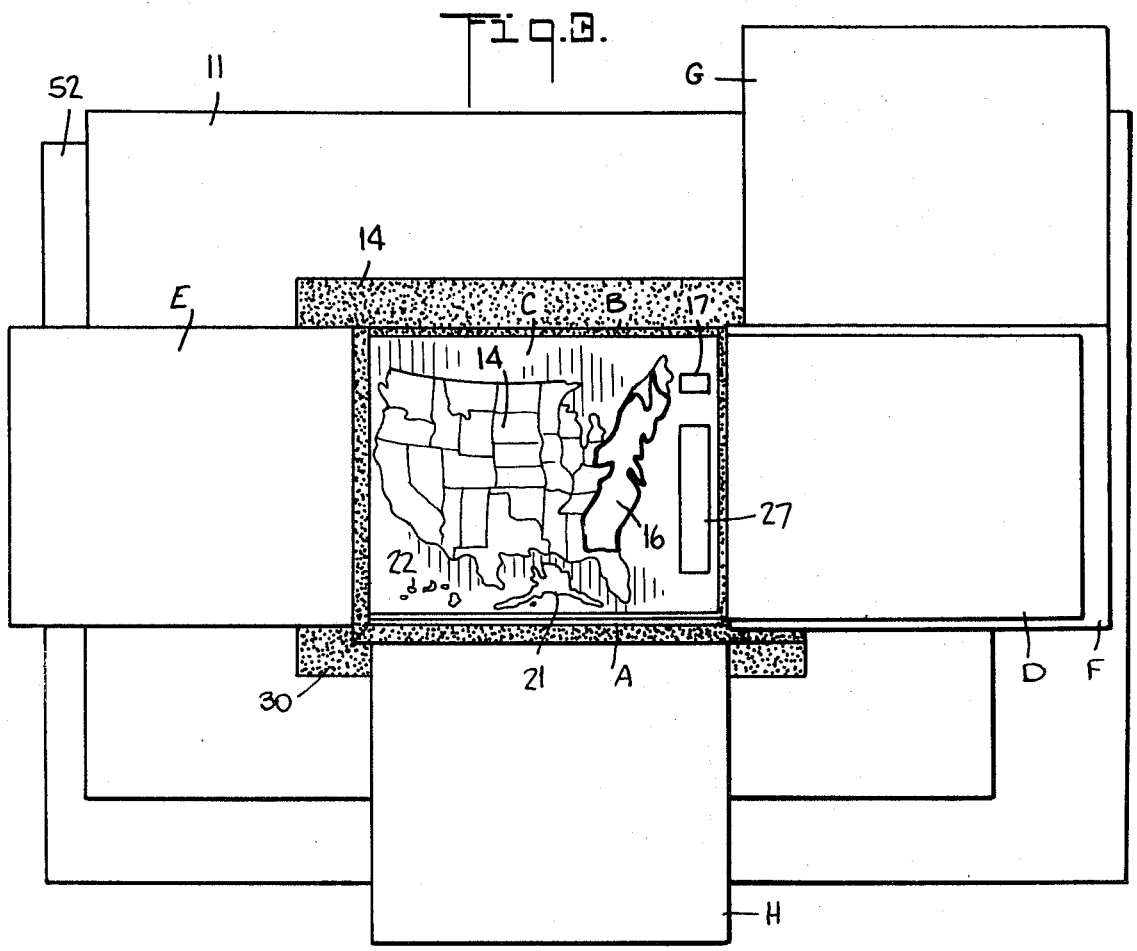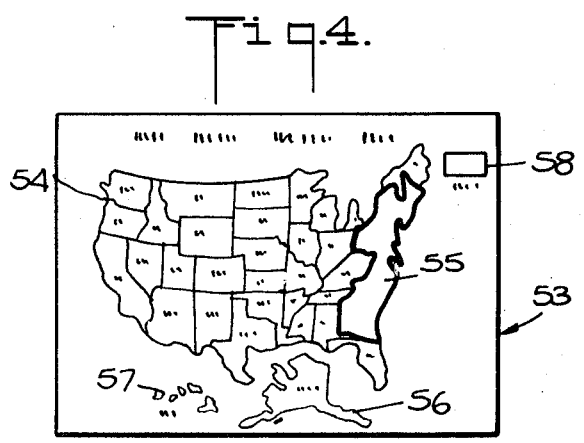

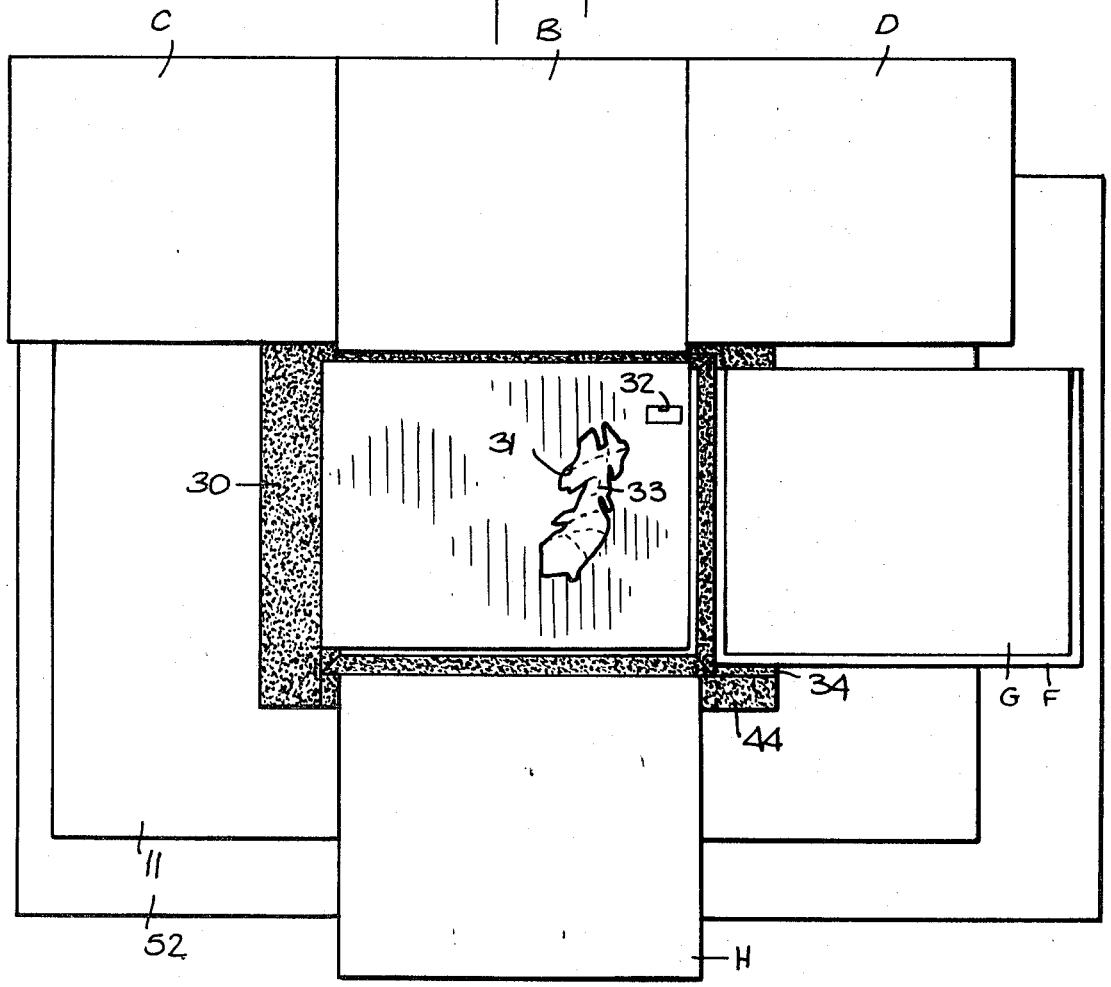
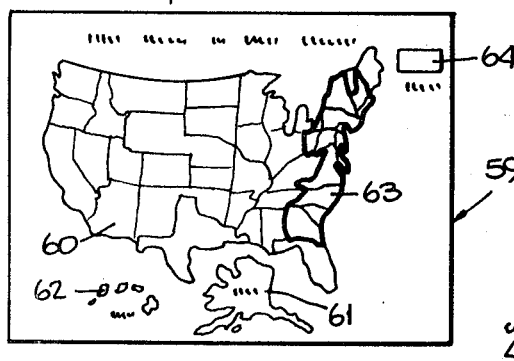

METHOD OF MAKING A MULTICOLOR SLIDE TRANSPARENCY AND THE PRODUCED SLIDE TRANSPARENCY

This invention relates to a method of making a multicolor slide transparency. More particularly, this invention relates to a method of making a multicolor slide transparency for daylight projection and the slide transparency produced.

Heretofore, in the field of educational projection, use has been made of various types of transparencies for projecting an image such as a chart, map, symbol, or the like, onto a screen surface for viewing by an audience. These transparencies have usually been prepared in various manners with the image to be projected on the transparencies and have been projected by different types of projectors such as overhead projectors and slide projectors onto the screens. However, in many cases, especially where slide projectors have been used, it has been necessary to project an image in a darkened room in order to present a projected image of good definition and fine detail. Because of this, the audience has usually been unable to write or take notes during the presentation of the projected images.

In order to avoid the need to darken a room, overhead projectors have frequently been used to project the images of transparencies onto screens. However, the images which have been projected have generally been lacking in quality, especially where the images are multicolored. That is, the acuteness and clarity between adjacent colors has not been sharp and the brightness of the image has not been sharp or crisp. Also, these overhead projectors while being able to project an image onto a screen in a lighted room have used transparencies of substantial size, for example, 10 inches by 10 inches. Also, these overhead projectors have required mounting of the transparencies in a horizontal position over a strong light source for projection by an overhead lens to a screen. Thus, when a series of transparencies are to be projected, because of the size and the mounting of these transparencies, each transparency of the series has generally been handled and selected from the series in a manual fashion. Further, the overhead projector has required mounting at the front of a classroom close to the screen due to the use of a large lens. Still further, due to the required manual manipulation of the transparencies, a lecturer or teacher has been limited to pointing out specific features of the projected image by moving a pointer over the transparency or marking of the transparency on the projector. Also, the use of overhead projectors has been relatively expensive.

Accordingly, it is an object of the invention to provide a slide transparency which can be projected by a slide projector in a lighted room.

It is another object of the invention to make a slide transparency which effects a projected image of excellent definition and detail.

It is another object of the invention to project an image onto a blackboard, greenboard or chalkboard.

It is another object of the invention to make a slide transparency which effects a projected multicolor image of excellent quality without graininess.

It is another object of the invention to provide a series of slide transparencies which can be sequentially projected by an automatic or semiautomatic cartridge slide projector.

It is another object of the invention to project the image of a slide transparency without the use of a screen.

It is another object of the invention to provide a low-cost system for projecting a series of multicolor transparencies onto a viewing surface in daylight or a lighted room.

It is another object of the invention to project a sequence of images onto a blackboard by remote control to enable a lecturer to point out or mark specific features of the images directly on the blackboard.

Briefly, the invention provides a method of making a multicolor slide transparency of high-intensity colors and quality for use with a random access slide projector in daylight. The method is also used to prepare a number of slide transparencies for a predetermined series. In one embodiment, in order to prepare a series of slide transparencies, a film, for example, of cellulose acetate material, is positioned over and in spaced relation to a light source. Thereafter, in order to produce on the film an image having a number of differently colored sections, for example, an image of a map, a pair of overlays are positioned in registration on a suitable holder between the light source and film. One overlay includes a transparent white-on-black contour layout of the image to be produced with similar transparent white-on-black legends as well as a transparent area within the image which contains opaque contour outlines and lettering. The second overlay is transparent except for an opaque area corresponding to the transparent area of the first overlay which is positioned to cover the transparent area when in registration with the first overlay. Light is then passed through the overlays to expose the film. However, the light only passes through the transparent contour and legend lines so that the film is exposed only in this pattern. Should the film be of the type which is subject to a negative to positive process and be developed at this point, only a white-on-black map contour and legend would appear.

After the first exposure, the film is maintained in place and a third overlay is placed in registry over the first overlay. This third overlay is opaque except for a transparent colored area positioned to register with the transparent area of the first overlay. The transparent colored area is formed by a transparent colored gel. The gel is a chromatic color so that light can pass through without distortion and is of high saturation so as to produce an image of extraordinary brilliance, intense color, sharpness, and clarity without graininess. Light is then passed through the two registered overlays to reexpose the film. This causes the film to develop the latent image of the colored area. Should the film be developed at this point, a negative is produced which subsequently gives a positive having a contoured image of white-on-black having a colored area of vivid intense color. Such a positive can be projected in daylight or a lighted room onto a wall, blackboard, or screen to produce a bright image having definition and fine detail without graininess.

In order to produce more than one colored area within the linear contour of a slide transparency, other transparent overlays containing various opaque areas to block out irrelevant information and transparent colored areas to pass colored light to the unexposed areas of the film are used. For example, with the film remaining in place, other overlays having other colored areas for registration with the image of the first overlay replace the first three overlays on the holder in the path of the light in predetermined sequences and repeated exposures are made as above in order to provide the film with areas of different colors. Thus, upon development of the film and making of a positive, a slide transparency having an image of multicolor areas is produced.

In order to produce a number of slide transparencies having the same linear contour but differing colored areas, for example, for a sequential development, several transparent overlays containing various opaque areas are used to block out information on the first overlay irrelevant to a particular slide transparency in the sequence while permitting discrete transparent colored areas to be exposed to the film. Succeeding slide transparencies in the sequence can therefore contain more lettering while the final slide transparency contains in combination all the previously separately revealed information. For example, after exposure of the first film as above to produce the first slide of the series, a fresh film is placed above the light source. This fresh film is first exposed as above to produce a single-colored image. Next, with another overlay having a differently colored area for registration within the image placed in the path of light, the film is exposed a third time. This produces a second film which is able to produce a second positive slide transparency of the same linear contour image as the first but with two different areas of different colors. These two slide transparencies can then be projected in sequence to visually demonstrate a sequence of steps or growth in the image, for example, the stages in the growth of the United States on a map.

As many slide transparencies as needed for a series to show a development or change are produced according to the invention. Such a series can then be placed in a slide magazine and thereafter projected by a random access slide projector, for example, under remote control to a viewing surface.

Alternatively, a particular slide transparency can be prepared by exposing a first overlay containing a transparent white on opaque black image contour and a transparent colored area which in area comparison to the transparent white area does not exceed a 1 to 3 ratio. The colored area which is either outlining or lettering is produced by covering a transparent area of the overlay with a transparent colored gel or transparent aniline dye applied with a brush. Thereafter, individual overlays containing transparent colored areas of the image are placed in registry over the first overlay or directly over the light source and exposed to the film. The number of such overlays determine the number of film exposures such that the various colors are imposed on the film. The film negatives which are produced in this matter can then be used to make various positives for use, as above.

Also, instead of using film which undergoes a negative to positive process in development, a film can be used which is exposed positively from the start and remains in that state. For example, a film such as Ektachrome reversal film can be used. With such a film, upon exposure to the first overlay having a transparent white-on-black image contour and subsequent development, a transparent contour on an opaque background is produced on the "positive."

In order to manipulate the various overlays into registry with each other over the light source, a master is used. This master includes a holder, for example, of self-supporting transparent material which is blocked out about a transparent window. The several overlays are mounted on the holder either directly or indirectly by mounting on another overlay. The overlays are mounted in a hinged manner by suitable means such as tape to overlie the transparent window of the holder with the various transparent areas and opaque areas in registry. The arrangement of the overlays on the holder is such that certain preselected overlays are pivoted over the holder window while the other overlays are pivoted out of the projected plane of the window. This allows different combinations of overlays to be placed over the light source within the holder window so that the various discrete colored areas can be exposed to a film in proper sequence.

The images which are projected onto a viewing surface from the slide transparencies possess such qualities of sharpness, acuteness, and brightness of color that the images can be projected in daylight. Further, since the slide transparencies are of a size to be used with a slide projector, a series of such slides can be used in a relatively simple economical manner in making a visual presentation to an audience, for example, of students.

These and other objects and advantages of the invention will become more apparent from the following detailed description and appended claims taken in conjunction with the accompanying drawings in which:

FIG. 2 illustrates a plan view of the master with a first overlay over the window of the holder with the remaining overlays laid out as viewed from the faceup side;

FIG. 3 illustrates a plan view of the master having a first series of preselected overlays in registration over a light source for a first exposure to a film;

FIG. 4 illustrates the image on a slide transparency developed from the film exposed to the registered overlays of FIG. 3;

FIG. 5 illustrates a plan view of the master having a second series of preselected overlays in registration for exposure to the exposed film;

FIG. 6 illustrates a view of the image of a slide transparency made from a double-exposed film exposed to the registered overlays of FIGS. 3 and 5 displaying a colored area;

Figure 1:
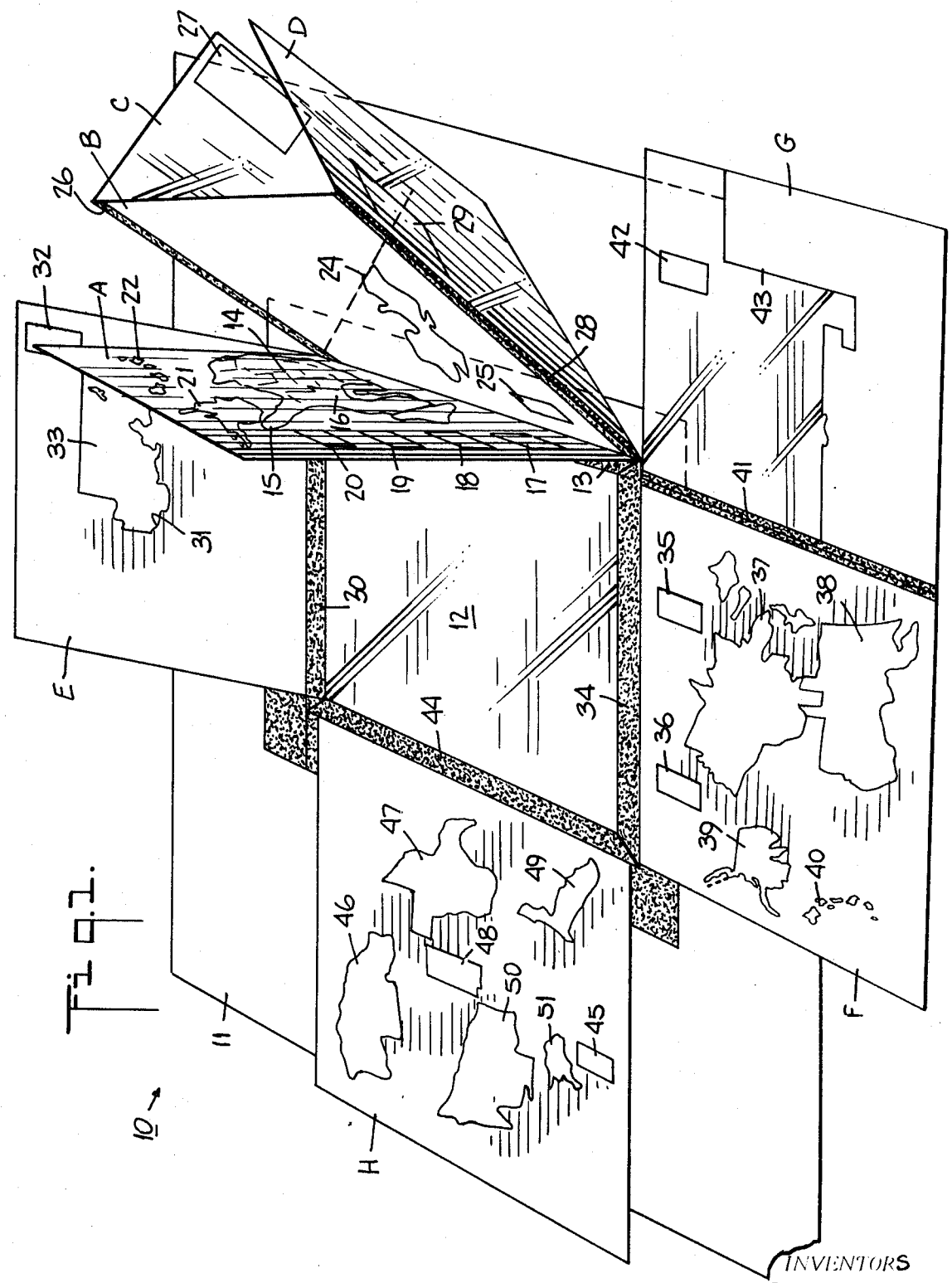
FIG. 1 illustrates a perspective view of an opened master according to the invention having a plurality of overlays mounted thereon for registration with each other.

Referring to FIG. 1, in order to prepare a series of slide transparencies displaying, for example, the stages in the growth of the United States by means of a map, a master 10 is prepared containing a plurality of overlays which are mounted for registration with each other. The overlays are pivotally mounted on the master 10 so as to be selectively placed in a predetermined sequence over the central portion of the master 10. For example, in order to produce three colored slide transparencies, the master 10 has a main support 11 which includes a transparent window 12 of substantially rectangular shape. The main support 11 is made of any suitable stiff transparent material such as a self-supporting plastic sheet and is made opaque, for example, with tape, at least around the window 12.

Referring to FIGS. 1 and 2, a first overlay A is pivotally mounted on the support 11, for example, by a strip of adhesive tape 13 so as to overlay the window 12. This overlay A is formed of a transparent sheet on which a transparent white-on-opaque black map image 14 with transparent lettering 15 for the state designations is formed. For example, the overlay A is formed of a reduced duplicate in negative form on a cellulose acetate sheet. Such a reduced duplicate in negative form can be prepared by photographing the original preseparated art work used for textbook production or other art work or text not originally prepared for textbook production. Alternatively, a reduced duplicate in positive form can also be used. In addition, an area 16 representing the space occupied by the Original Thirteen States and a block 17 to one side of the map image 14 are transparent. Also, opaque lettering is placed within this area 16 in proper places to designate the states therein. Transparent legend box outlines and lettering 18, 19, 20 are also provided below the transparent block 17 while transparent map images 21, 22 are provided for the states of Alaska and Hawaii.

Referring to FIGS. 1 and 2, a second overlay B of transparent material such as a clear plastic sheet is pivotally secured to the support 11 on one side of the first overlay A as by a strip of adhesive tape 23 to overlay the map image 14. This second overlay B has opaque areas 24, 25 formed thereon which register over the area 16 and block 17 of the first overlay A when in overlaying relationship.

A third overlay C of transparent plastic material is pivotally attached to one side of the second overlay as by tape 26 and includes an opaque area 27 which is positioned to register over the legend box outlines and lettering 18, 19, 20 of the first overlay A when laid over the first overlay A. The opaque area 27 can be formed, for example, by a tape, opaque paint or other suitable material.

A fourth overlay D of transparent plastic material is pivotally attached, as by tape 28, to the opposite side of the second overlay B from the third overlay C. This overlay D includes an opaque area 29 formed as above which is positioned to register over the legend box outlines and lettering 19, 20 of the first overlay A when laid thereover.

A fifth overlay E of transparent plastic material is pivotally attached as by tape 30 to another side of the window 12 to overlay the map image 16 of the first overlay A. This overlay E is made opaque, for example, by taping over and applying black acrylic paint, in all areas except for two areas 31, 32 which are positioned to register over the transparent area 16 and block 17 of the first overlay A. In addition, a strip 33 of transparent colored gel, for example, of green color, is secured over the transparent areas 31, 32.

A sixth overlay F of transparent material, for example, a reduced duplicate in negative form on cellulose acetate as above described, is pivotally secured as by tape 34 to another side of the window 12. This overlay F which is opaque is provided with six transparent areas 35—40 which are positioned to overlay the window 12 in a position to register with the map images 14, 21, 22 and legend box outlines 18, 20 of the first overlay. In order to improve the opacity of the overlay F, tape and/or black acrylic paint can be added to the opaque areas. In addition, strips of transparent colored gel are secured over the respective transparent areas 35—40 of the overlay F. For example, strips of red gel are secured over the block area 35 and the map area 37 to register with the legend box outline 18 and an area within the map image 14 of the first overlay A while strips of blue gel are secured over the block area 36 and remaining map areas 38, 39, 40 to register with the legend box outline 20, another area within the map image 14, and the map images 21, 22 of the first overlay A.

Referring to FIG. 1, a seventh overlay G of transparent plastic material is pivotally secured as by tape 41 to an edge of the sixth overlay F to overlie the sixth overlay F when placed over the window 12. This seventh overlay G is provided with opaque areas 42, 43 which are sized and positioned to register with the blue colored areas 36, 38, 39, 40 of the sixth overlay F. As above, these opaque areas 42, 43 can be formed by tape or an opaque paint.

Finally, referring to FIGS. 1 and 2, an eighth overlay H of a reduced duplicate in negative form of a cellulose acetate is pivotally secured as by tape 44 to the support 11 on the remaining side of the window 12 to register with the map image 14 and legend box outline 19 of the first overlay A. This overlay H is provided with transparent areas 45—51 which are covered by a strip of colored transparent gel, for example, of pink color. The transparent area 45 is sized to register with the legend box outline 19 of the first overlay A while the remaining areas 46—51 are sized and positioned to register with various areas within the map image 14 of the first overlay A.

Referring to FIG. 3, in order to prepare the first slide of the series of slide transparencies, the master 10 is mounted over a suitable light source 52 with the window 12 centered over the light source. Thereafter, a high contrast film (not shown), for example, of cellulose acetate, is positioned in a camera over the master 10 and set in alignment with the light source 52 and window 12 of the master 10 for exposure. Next, the first overlay A is pivoted into position across the window 12. Thereafter, the second and third overlays B, C are pivoted into registration over the first overlay A as shown. Light from the light source 52 is then passed through the window 12 towards the positioned film. As the overlays have various opaque areas, light passes through these overlays only in those areas which are transparent and produces a latent map image and lettering on the film. It is noted that the remainder of the overlays, i.e. D to H, are pivoted out of the projected plane of the window 12 as shown. Further, for purposes of clarity, the various details of these latter overlays have not been shown in FIG. 3.

Referring to FIG. 4, should the exposed film be processed to produce a slide transparency 53 after the first exposure, the image on the slide transparency would consist of a transparent white-on-black map image 54 of continental United States with various state boundaries and lettering shown by transparent lines and an area 55 corresponding to the area of the Thirteen Original States without designation of the state boundaries. Also, the slide transparency would consist of transparent map images 56, 57 for the states of Alaska and Hawaii and a transparent legend outline and lettering 58 to one side of the map image 54.

Referring to FIG. 5, after this first exposure, the first overlay A and fifth overlay E are pivoted into registry over each other over the window 12. During this time, the remaining overlays B—D and F—G are pivoted out of the projected plane of the window 12. Light is then passed through the window 12 and overlays A, E from the light source 52 to the film in the camera. As the fifth overlay E is opaque except for portions 31, 32, the light only passes through these portions 31, 32 to the film. Also, as the transparent area 16 and block 17 of the first overlay are covered by the transparent green-colored strips of the transparent portions 31, 32 of the fifth overlay E only green light passes to the film and only in those areas not made opaque by the lettering in area 16.

Referring to FIG. 6, upon development of the double-exposed film in a known manner, a slide transparency 59 is produced. This slide transparency 59 includes a transparent white-on-black map image 60 with transparent white state boundaries and lettering and similar map images 61, 62 of the states of Alaska and Hawaii. Also, a green-colored area 63 within the map image 60 corresponding to the Thirteen Original States and a green-colored block area 64 outside the map image 60 are produced. The lettering within the green-colored map area 63 appear opaque black. Also, the lettering under the block area 64 and the lettering over the map image 60 appear transparent white.

Upon projecting the image of the slide transparency onto a viewing surface, for example, a blackboard, from a slide projector light passes substantially only through the transparent white and green areas to produce an image on the blackboard corresponding to the image on the slide transparency. That is, a white map outline of continental United States, a green-colored area within the map outline containing black lettering, a white outline of the states of Alaska and Hawaii, white lettering and a green-colored legend block outside the map. The legend block cooperates with the lettering below to indicate that the green-colored area of the map image represents the Original Thirteen States.

Figure 7:
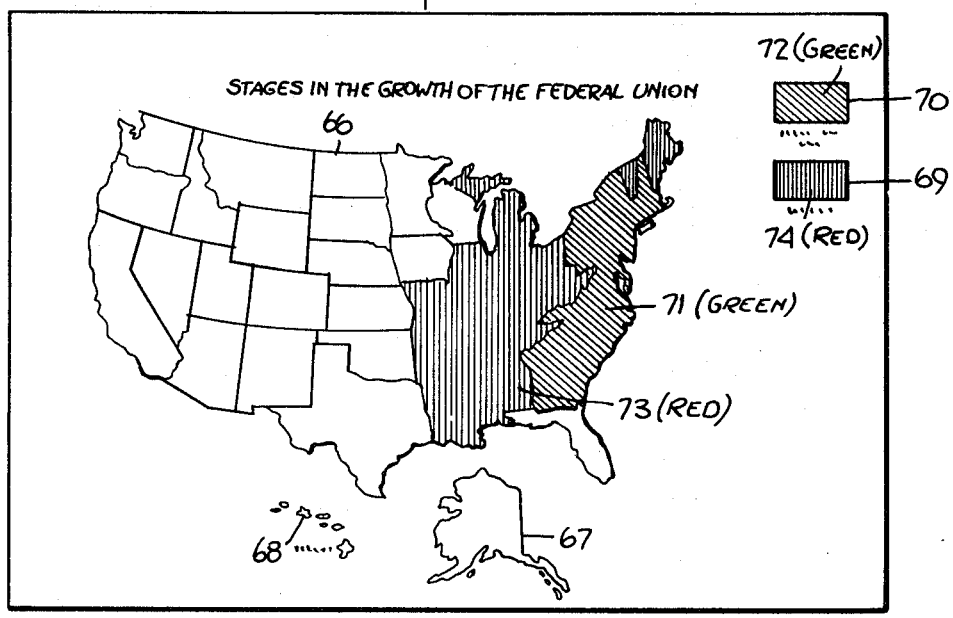
FIG. 7 illustrates a view of the image of another slide transparency made from the master of FIG. 1 displaying differently colored areas.

In order to prepare the remainder of the series of slide transparencies, with the master 10 maintained over the light source and fresh unexposed film mounted over the master for each slide transparency to be made, the overlays are manipulated in predetermined sequence to produce each subsequent slide transparency. For example, referring to FIG. 7, to prepare the second slide transparency 65 the first A, second B and fourth C overlays are disposed over the window 12 and the film is exposed to light a first time. Next, the first A and fifth E overlays are disposed over the window 12 and the film is exposed a second time. Finally, the sixth F and seventh G are disposed over the window 12 and the film is exposed a third time. In sequence, this first produces map images 66, 67, 68 and lettering as in FIG. 4 along with a second legend block outline and set of lettering 69 under the first legend block outline and set of lettering 70. Next, the green-colored areas 71, 72 of the map image and first legend block are formed as in FIG. 6. Finally, the red-colored map areas 73 and block 74 are imposed. The slide transparency 65 thus shows two color schemes, for example, the first and second stages of growth of the United States along with the corresponding lettering.

Figure 8:
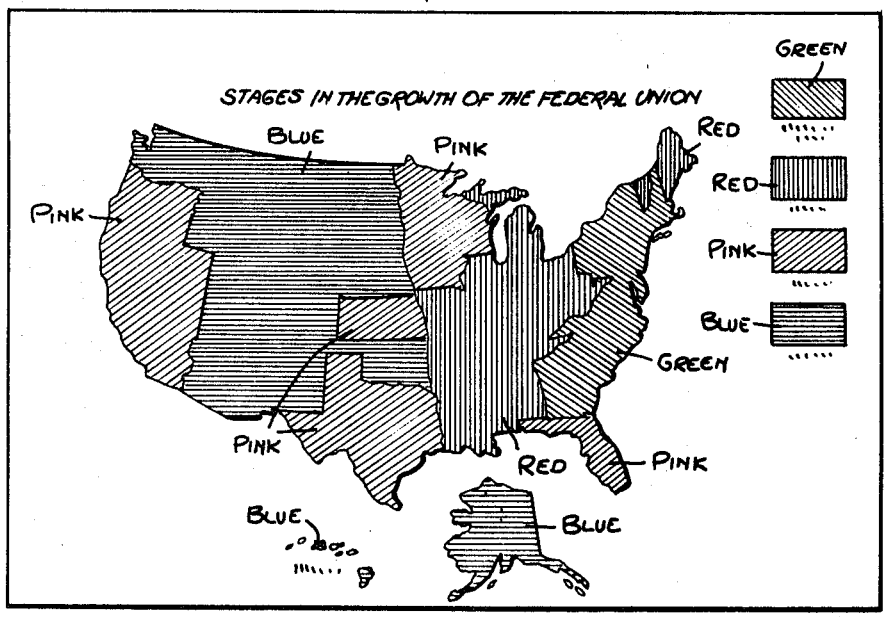
FIG. 8 illustrates a view of the multicolor image of the last in a series of slide transparencies made in accordance with the invention.

A third slide transparency 75 (see FIG. 8) is also prepared by exposure of a film in four steps. The first exposure is made to the first A and second B overlays to produce a map image as above and four outline blocks and sets of lettering. The second exposure is made to the first A and fifth E overlays to impose the green-colored map and block portions as above. The third exposure is made to the sixth F overlay to impose the red- and blue-colored map and block portions. The fourth exposure is made to the eighth H overlay to impose the pink-colored map and block portions on the film.

The slide transparencies produced in accordance with the invention have permanent integrated transparent colored sections which pass colored light in a substantially uniform manner such that the projected image displays excellent details and color characteristics. Further, the colors of a projected image are so brilliant and intense due to the use of transparent colored gels in making the slide transparency that the image can be shown on a viewing surface, such as a blackboard, wall or screen, in daylight or a lighted room. Also, these transparent gels substantially reduce the graininess factor of the projected image due to the uniformity of the gels while allowing sharp contrast between adjacent colored sections to be maintained. The slide transparencies can thus be used by a teacher or lecturer in a lighted classroom or lecture hall while the students are allowed to record notes concerning the subject matter of the projected image.

Also, where the audience is composed of students of an early age, the use of the slide transparencies in a lighted room allows a teacher to retain control of the students which might otherwise be lost in a darkened room.

Also, since the slide transparencies can be conveniently and easily made of a size such as 1½ inches by 1½ inches, 30 mm., 35 mm. and the like, a series of such slide transparencies can be easily and economically utilized with known slide projectors, especially of the random access type. For example, where a large number of slide images to be shown in a visual presentation of a selected topic, the slide transparencies can be automatically or semiautomatically interchanged in the projector in a minimum of time. This avoids the possibility of a loss in the viewers interest in the topic which can otherwise occur, for example, in manually interchanging slides on an overhead projector and blank screen. Also, by using a variable length focal lens in the projector, the projector can be set up at any convenient location which is suitable for projecting the images of the slide transparencies.

Further, since a series of slide transparencies of the invention can be utilized by remote control projectors, a teacher can remain at a blackboard to point out details or write over an image such as a map projected onto the blackboard from a distant projector. In this regard, by using chalk, white or colored, a teacher can lay over a particular colored area projected onto the blackboard to create an iridescent glow. This glow is caused by the projected colored light being reflected by the coarseness of the chalk on the blackboard.

It is noted that the invention allows a variety of colors, shades and tones to be used. Further, the invention allows white type or lettering to be used against any color background.

It is noted that in describing the method of the invention with respect to making a series of slide transparencies, that reference is made to a map of the United States. However, in order to conserve on details and space, the map is not to be otherwise interpreted as accurate in mapping or historical details.

It is also noted that while the overlays are generally described as being transparent with individual strips of colored gel and discrete opaque areas that each overlay containing a related color can be made of a sheet of that transparent colored gel with opaque areas formed thereon by blackening.

Having thus described the invention it is not intended that it be so limited as changes may be readily made therein without departing from the scope of the invention. Accordingly, it is intended that the subject matter described above and shown in the drawings be interpreted as illustrative and not in a limiting sense.

What we claim is:

1. In a method of preparing a slide transparency the steps of
positioning a film in a fixed position;
mounting an opaque overlay containing at least one transparent colored area of predetermined size and shape formed by a transparent colored gel thereon in spaced relation to said film; and
projecting white light through said transparent colored area of said overlay towards said film to produce a first latent predetermined image on said film corresponding to said transparent area.

2. In a method of preparing a slide transparency the steps of
positioning a film in a fixed position;
mounting an opaque overlay containing at least one transparent colored area formed by a transparent colored gel thereon in spaced relation to said film;
projecting light through said transparent colored area of said overlay towards said film to produce a first latent image on said film corresponding to said transparent area;
subsequently mounting a second overlay containing at least one transparent colored area formed by a transparent colored gel thereon in spaced relation to said film; and
thereafter projecting light through said transparent colored area of said second overlay towards said film to superimpose a second latent image on said film corresponding to said colored area of said second overlay in spaced relation to said colored area of said first latent image.

3. In a method as set forth in claim 2 the further steps of processing the doubly exposed film and imparting the image of the processed film to a slide transparency whereby the slide transparency contains a multicolor image of extraordinary brilliance.

4. A method of preparing a film for making a slide transparency comprising the steps of
preparing a first overlay having a transparent contour line and at least one transparent area within said contour line imposed thereon, the remainder of said first overlay being opaque;
preparing a second overlay having at least one opaque area for registration over said transparent area of said first overlay, the remainder of said second overlay being transparent;
preparing a third overlay having at least one transparent colored area for registration within said contour line of said first overlay in overlying relation with said transparent area of said first overlay, the remainder of said third overlay being opaque;
mounting said first and second overlays in registration between a light source and a film;
passing light from said light source through said transparent contour of said first overlay onto said film to produce a latent image thereon corresponding to said contour line;
subsequently mounting said third overlay between said light source and said film in a position registered relative to the prior position of said first overlay; and
thereafter passing light from said light source through said transparent colored area of said third overlay to produce a colored latent image thereon corresponding to said transparent area within said contour line.

5. A method as set forth in claim 4 wherein said transparent colored area is formed by a transparent colored gel.

6. A method as set forth in claim 4 wherein said first overlay further has a transparent colored area and a transparent white area thereon in an area to area ratio of not more than 1 to 3, respectively.

7. In a method of preparing a multicolored slide transparency the steps comprising:
preparing a first overlay having at least one transparent white contour line and transparent white lettering within said contour line thereon, the remainder of said first overlay being opaque;
preparing a second overlay having at least one transparent colored area formed by a transparent colored gel thereon, the remainder of said second overlay being opaque;
mounting said first overlay in a first position between a film and a light source;
projecting light from said light source through said transparent white contour line and lettering on said first overlay to said film to produce a first latent image thereon corresponding to said transparent white contour line and lettering;
subsequently mounting said second overlay in said first position to register said transparent colored area within said transparent contour line; and
thereafter projecting light from said light source through said transparent colored area on said second overlay to said film to produce a second latent image thereon corresponding to said transparent colored area in superimposed relation on said first latent image whereby a latent image is produced on the film having a colored area surrounding the latent image of said lettering and contained within the latent image of said contour line.

8. The method of claim 7 further comprises the step of making a slide transparency from said film, said slide transparency having a transparent white contour line and lettering thereon and a colored area of extraordinary brilliance within the contour line and surrounding the lettering thereon.

9. The method of claim 7 wherein said transparent colored gel is of high saturation.

10. A method of preparing a series of color slide transparencies comprising the steps of
positioning a first high contrast film in a fixed position;
mounting a first overlay having a transparent white contour line thereon in spaced relation to said first film;
projecting light through said transparent contour line of said first overlay towards said first film to produce a first latent image on said first film corresponding to said transparent contour line;
subsequently mounting an opaque second overlay having a transparent colored area thereon in spaced relation to said first film to register said colored area within said contour line of said first overlay;
thereafter projecting light through said transparent colored area of said second overlay towards said first film to produce a latent colored image within said first latent image;
positioning a second film in said fixed position;
mounting said first and second overlays in sequence in spaced relation to said second film;
sequentially projecting light through said first and second overlays to produce a first latent image on said second film corresponding to said transparent contour line of said first overlay and said colored area of said second overlay;
subsequently mounting a third overlay having a transparent colored area thereon in spaced relation to said second film to register within said contour line of said first overlay; and
thereafter projecting light through said transparent colored area of said third overlay towards said second film to produce a third latent image on said second film corresponding to said colored area of said third overlay within the latent image of said contour line.

11. A method as set forth in claim 10 further including the steps of processing each of said first and second exposed films and imparting respective slide transparencies with a first image containing a transparent white contour line and a colored area within the contour line or a second image containing a transparent white contour line and two colored areas within the contour line.

12. A method as set forth in claim 10 further comprising the steps of mounting at least a third film in said fixed position, mounting said first, second and third overlays in sequence in spaced relation to said third film and projecting light through each said overlay to produce a first, second and third latent image on said third film, and thereafter mounting a fourth overlay having a transparent colored area in spaced relation to said third film and projecting light through said fourth overlay to produce a fourth latent image on said third film within the latent image of said contour line.

13. A method as set forth in claim 10 wherein each said transparent colored area is formed by a transparent colored gel.

14. A method as set forth in claim 10 wherein said transparent areas include areas of different colors.

15. A method as set forth in claim 10 wherein at least one transparent colored area is formed by a transparent aniline dye.

16. A slide transparency made by a method which includes steps of positioning a film in a fixed position, mounting an opaque overlay containing at least one transparent colored area of predetermined size and shape formed by a transparent colored gel thereon in spaced relation to said film, projecting white light through said transparent colored area of said overlay towards said film to produce a first latent predetermined image on said film corresponding to said transparent area, processing the exposed film and imparting the image of the processed film to a slide transparency wherein said slide transparency has an integral color transparent area of extraordinary brilliance and high intensity thereon being free of graininess and of a brightness corresponding to a transparent colored gel.

17. A slide transparency made by a method which includes the steps of positioning a film in a fixed position; mounting an opaque overlay containing at least one transparent colored area formed by a transparent colored gel thereon in spaced relation to said film, projecting light through said transparent colored area of said overlay towards said film to produce a first latent image on said film corresponding to said transparent area, subsequently mounting a second overlay containing at least one transparent colored area formed by a transparent colored gel thereon in spaced relation to said film, thereafter projecting light through said transparent colored area of said second overlay towards said film to superimpose a second latent image on said film corresponding to said colored area of said second overlay in spaced relation to said colored area of said first latent image, processing the doubly exposed film and imparting the image of the processed film to a slide transparency whereby the slide transparency contains a plurality of integral color transparent areas of extraordinary brilliance and high intensity thereon, each of said areas being free of graininess and of a brightness corresponding to a transparent colored gel.